United States Patent [19]

Johnson et al.

[11] 4,131,054
[45] Dec. 26, 1978

[54] HIGH SPEED SPINDLE AND DRAW BAR ASSEMBLY

[75] Inventors: Charles R. Johnson, Howell; John K. Forlow, Wixom; Paul G. Black, Whitmore Lake, all of Mich.; William A. Mitchell; John S. Clark, both of Springfield, Vt.

[73] Assignee: Ex-Cell-O Corporation, Troy, Mich.

[21] Appl. No.: 767,013

[22] Filed: Feb. 9, 1977

Related U.S. Application Data

[63] Continuation-in-part of Ser. No. 739,417, Nov. 8, 1976, abandoned.

[51] Int. Cl.$^2$ .............................................. B23C 5/26
[52] U.S. Cl. ................................. 90/11 D; 408/239 A
[58] Field of Search ................... 90/11 D; 408/239 A, 408/239 R, 16; 29/568

[56] References Cited

U.S. PATENT DOCUMENTS

| | | | |
|---|---|---|---|
| 3,486,412 | 12/1969 | Schraub et al. | 408/239 A X |
| 3,520,228 | 7/1970 | Wohlfeil | 90/11 D |
| 3,842,712 | 10/1974 | Bondie et al. | 90/11 D |
| 3,875,848 | 4/1975 | Powell | 408/239 X |
| 3,893,371 | 7/1975 | Frazier | 408/239 X |

*Primary Examiner*—Gil Weidenfeld
*Attorney, Agent, or Firm*—James H. Bower; Mitchell J. Hill

[57] ABSTRACT

A machine tool high speed spindle assembly and draw bar assembly, wherein the spindle assembly includes a hollow, rotary spindle shaft, and the draw bar assembly is nonrotational relative to the spindle shaft. The draw bar assembly is axially movable within the hollow rotary spindle shaft, and it includes a tool holder gripping means. The draw bar assembly rotates with the hollow rotary spindle shaft during a machining operation. The draw bar assembly with its tool holder gripping means is moved by an actuator means between an operative position for retaining a tool holder or the like in the spindle shaft, and an inoperative position to permit a tool holder or the like to be removed from or inserted into the spindle shaft. A spindle shaft holding or gripping means retains the hollow rotary spindle shaft in a stationary position when the draw bar actuator means moves the draw bar assembly between said operative and inoperative positions. The draw bar assembly actuator means and spindle shaft holding means each comprise collet means having relatively movable collet members and collet clamp ring members. The draw bar assembly actuator means and spindle shaft holding means are free from the spindle shaft and have no physical contact with said shaft during a machine tool operation.

19 Claims, 6 Drawing Figures

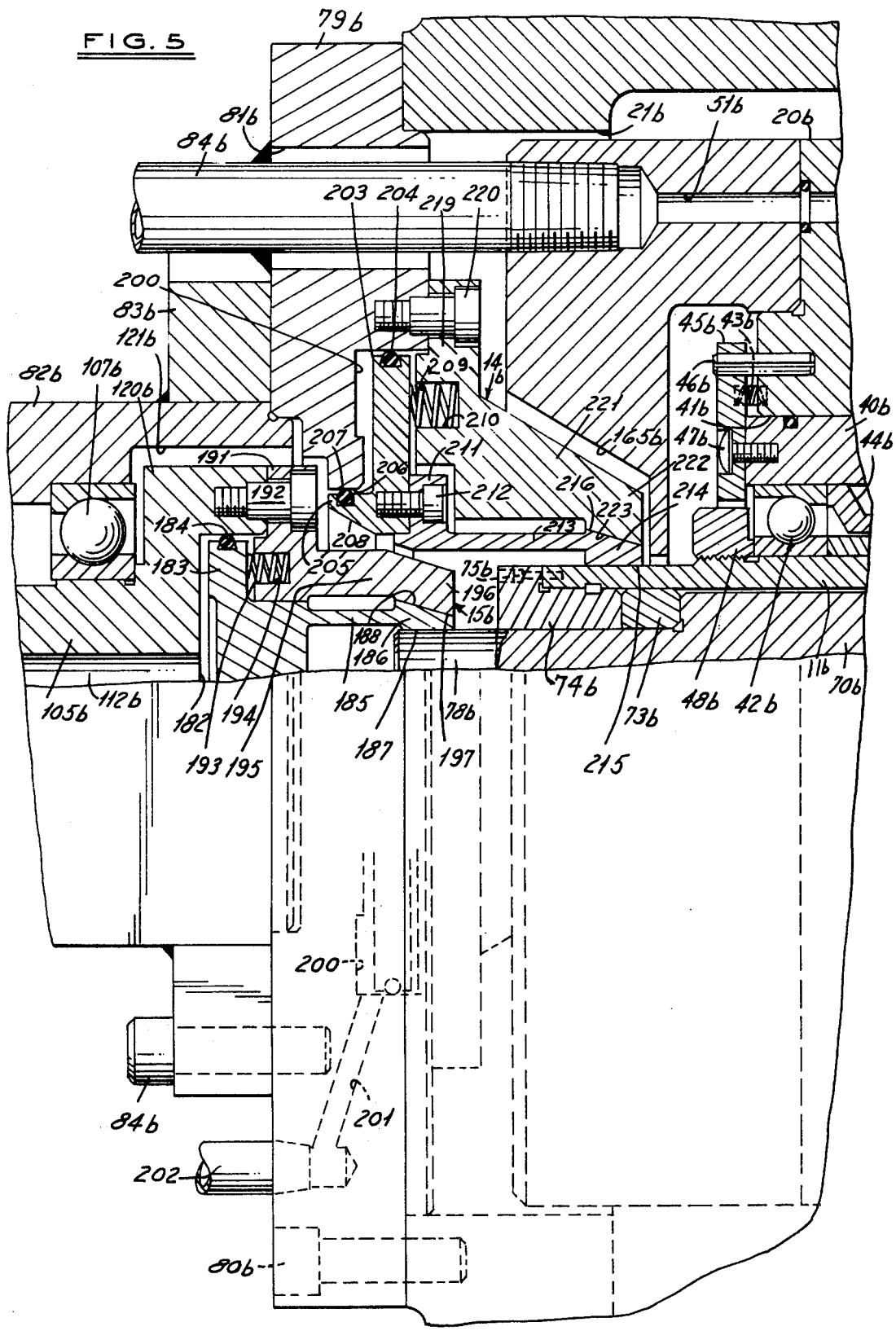

HIGH SPEED SPINDLE AND DRAW BAR ASSEMBLY

This is a continuation-in-part application of application Ser. No. 739,417, filed Nov. 8, 1976 now abandoned.

BACKGROUND OF THE INVENTION

1. Field of the Invention:

This invention relates generally to machine tool assemblies and components therefor, such as hollow rotary spindle shafts and draw bar assemblies for use with machine tools in the performance of various types of operations such as milling, drilling, boring, tapping, and the like. The invention is particularly concerned with a machine tool high speed hollow rotary spindle shaft in which is mounted an axially movable, nonrotational draw bar assembly that includes a tool holder gripping means. The draw bar assembly, with the tool gripping means, functions to draw a tool holder into a tight frictional engagement with a seat formed in a tapered bore in the spindle shaft, and the draw bar assembly with the tool holder gripping means rotates with the spindle shaft.

2. Description of the Prior Art

It is known in the machine tool art to provide hollow rotary spindle shafts in which are releasably mounted tool holders, or the like, that are held in position by a draw bar assembly that includes a tool holder gripping means, such as a collet means. The draw bar assembly is generally biased by springs to an operative position so as to secure a tool holder in a seat in a tapered bore in the spindle shaft by frictional engagement. The prior art draw bar assemblies are actuated from an operative tool holder retaining position to an inoperative tool holder releasing position against the bias of the springs by a suitable actuator means, such as a hydraulic motor, or the like, when it is described to remove a tool holder from a spindle shaft. Examples of the aforedescribed machine tool spindle shafts and draw bar assemblies and tool holder gripping means are illustrated in U.S. Pats. Nos. 3,516,149, 3,520,228, and 3,875,848.

A problem and disadvantage of the prior art draw bar assemblies and tool holder gripping means is that they exert a thrust on a rotary spindle shaft when the spindle actuator means is operated. The last mentioned thrust force on a spindle shaft is injurious to the spindle shaft high speed bearings. A further problem with the prior art draw bar assemblies and tool holder gripping means is that there is no way of indicating to the operator, when the draw bar assembly is moved to the operative position, and as to whether or not a new tool holder has been moved into position in the spindle shaft or whether or not the tool holder gripping means is broken.

SUMMARY OF THE INVENTION

In accordance with the preset invention, the draw bar assembly with a tool holder gripping means is mounted in a hollow rotary spindle shaft, and the draw bar assembly is retained in a non rotational position in the spindle shaft, but it is arranged and constructed for axial movement with respect to the spindle shaft between an operative position for retaining a tool holder or the like in the spindle shaft, and an inoperative position to permit a tool holder or the like to be removed from, or inserted into the spindle shaft. The draw bar assembly is moved between said operative and inoperative positions by an actuator means that includes a drive motor and a collet means for selective connection and disconnection of the drive motor and the draw bar assembly. A collet type spindle shaft holder means is provided for holding the spindle shaft stationary when the draw bar assembly is moved between said operative an inoperative positions. An indicator means is operatively connected to the drive motor for indicating an inoperative tool holder gripping means, or a no-tool holder condition. The collet means for connecting the drive motor to the draw bar assembly comprises a relatively movable collet member and collet clamp ring member. The spindle shaft holder means includes a relatively movable collet member and a collet clamp ring member. The collet means that drives the draw bar assembly is connected to the draw bar assembly by a rotatable drive means which includes a driven screw provided with left hand thread for safety purposes to prevent accidental unwinding of the rotatable drive means. The draw bar assembly is held in a nonrotational position relative to the hollow spindle shaft by providing the draw bar assembly with a polygon cross sectional shape at one portion thereof which is slidably mounted in a corresponding polygon sleeve portion in the hollow spindle shaft. The mating polygon shape portions of the draw bar assembly and spindle shaft eliminate vibration since these mating parts are initially balanced in accordance with the polygon shape.

Other features and advantages of this invention will be apparent from the following detailed description, appended claims, and the accompanying drawings.

BRIEF DESCRIPTION OF THE DRAWINGS

FIG. 1A is a fragmentary, broken, longitudinal view, partly in section, of the rear portion of the high speed rotary spindle assembly and draw bar assembly illustrated in FIG. 1.

FIG. 1 3 is a fragmentary, enlarged, elevation section view of the first embodiment draw bar actuator means shown in FIG. 1.

FIG. 5 is a fragmentary, enlarged, elevation section view of a third embodiment of a draw bar actuator means employed in the invention.

DESCRIPTION OF THE PREFERRED EMBODIMENTS

Figure 1:
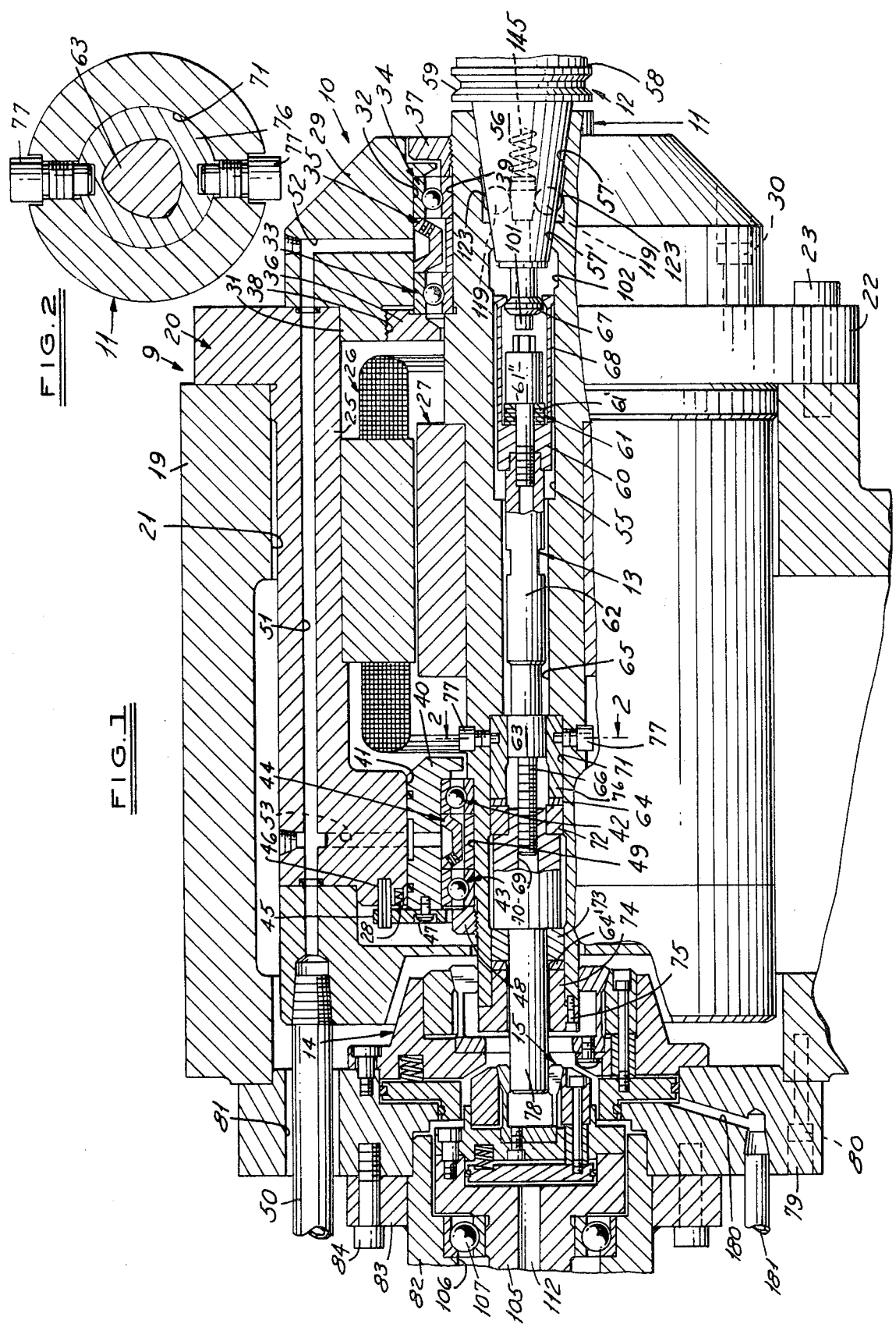
FIG. 1 is a fragmentary, longitudinal view, partly in section, of the front portion of a high speed rotary spindle assembly and draw bar assembly made in accordance with the principles of the present invention.

Referring now to the drawings, and in particular, to FIG. 1, the numeral 9 generally designates a portion of a machine tool in which is operatively mounted a high speed spindle assembly, generally indicated by the numeral 10. The spindle assembly 10 includes a hollow spindle shaft which is generally indicated by the numeral 11 and which operatively carries a tool holder, generally indicated by the numeral 12. The tool holder 12 is releasably retained in the spindle shaft 11 by a draw bar assembly, generally indicated by the numeral 13, and which includes a tool holder gripping means.

The numeral 14 generally designates a collet type releasable spindle shaft holding means for holding the spindle shaft 11 stationary when the draw bar and tool holder gripping means 13 is actuated axially within the spindle shaft 11 for either releasing the tool holder 12 or drawing the same into its operative position in the spindle shaft 11, as shown in FIG. 1. The numeral 15 generally designates a collet type releasable clamping means for connecting and disconnecting the draw bar assembly 13 to a hydraulic drive motor, generally indicated by the numeral 16 in FIG. 1A. The numeral 17 in FIG. 1A generally designates a switch means which functions as a broken collet or no-tool holder indicator means, as more fully described hereinafter.

As shown in FIG. 1, the numeral 20 generally designates a spindle shaft electric drive motor housing which is operatively mounted in a bore 21 formed in a machine tool housing portion designated by the numeral 19. The spindle shaft motor housing 20 is provided with an integral flange 22 on the front end thereof which is secured to the machine tool housing portion 19 by any suitable means, as by a plurality of machine screws 23. Operably mounted in a bore 25 in the spindle shaft motor housing 20 is a motor stator, generally indicated by the numeral 26, for a conventional electric drive motor for rotating the spindle shaft 11. A rotor for the spindle shaft drive motor is generally designated by the numeral 27, and it is fixed by any suitable means on the outer periphery of the spindle shaft 11. The front end of the bore 25 in the motor housing 20 is enclosed by a fixed spindle head 29 which is releasably secured to the front face of the motor housing flange 22 by any suitable means, as by a plurality of machine screws 30. The spindle head 29 is provided with an integral reduced diameter portion 31 which is slidably seated within the outer end of the motor housing bore 25.

The spindle shaft 11 is rotatably mounted at the front end thereof by a pair of suitable high speed ball bearing means, generally indicated by the numerals 33 and 34, and which are operatively mounted in an axial bore 32 in the spindle head 29. The ball bearing means 33 and 34 are laterally spaced apart by a spreader ring means and spacer sleeve assembly generally indicated by the numeral 35. A bearing locking ring 36 is threadably mounted in a threaded bore 38 formed in the spindle head 29 at the inner end of the bore 32. The bearing locking ring 36 bears against the outer race of the front inner ball bearing means 33. The outer race of the front outer ball bearing means 34 is seated against a shoulder formed at the outer end of the bore 32. The inner races of the ball bearing means 33 and 34 are operatively mounted on the front end of the spindle shaft 11, on the spindle shaft periphery portion designated by the numeral 39. The inner races of the front inner ball bearing means 33 is seated against a shoulder on the spindle shaft 11. A bearing retainer collar 37 is threadably mounted on the front end of the spindle body periphery portion 39, and it bears against the inner race of the front outer ball bearing means 34 for retaining the inner ball bearing races in an operative position on the spindle shaft 11.

As shown in FIG. 1, the rear end of the spindle shaft 11 is rotatably supported by a pair of suitable high speed ball bearing means, generally indicated by the numerals 42 and 43, which have their inner races operatively mounted around the spindle shaft periphery portion 49, and their outer races operatively mounted in a bore in an annular bearing block 40. The bearing block 40 is slidably mounted for longitudinal movement in a bore 41 in the motor housing 20. A circular retainer ring 45 is secured by suitable machine screws 47 to the outer end of the bearing block 40. A plurality of spring means 28 is operatively mounted between the bearing block 40 and the retainer ring 45 for imparting a rearwardly directed axial spring bias on the bearing block 40. The spindle shaft rear ball bearing means 42 and 43 are spaced apart by a suitable spreader ring means and spacer sleeve assembly, generally indicated by the numeral 44. The retainer ring 45 and the bearing block 40 are held stationary against rotary movement by roll pin 46 which has one end fixed in the motor housing 20 and the other end slidably mounted through a suitable bore in the retainer ring 45. The outer races of the rear bearing means 42 and 43 are retained in their operative position in the bearing block 40 by the retainer ring 45. The inner races of the rear bearing means 42 and 43 are retained on the spindle shaft periphery 49 by a retainer ring 48 which is threadably mounted on the spindle shaft peripery 49 and which bears against the inner race of the rear bearing means 43. The inner race of the rear bearing means 42 is positioned against a shoulder formed on the spindle shaft 11. The high speed spindle ball bearing means 33, 34, 42 and 43 are provided with a suitable lubricant through the bearing lubricant tubing 50 which communicates with the lubricant passages 51, 52 and 53.

As shown in FIG. 1, the tool holder 12 is provided with the usual tapered shank 56 which is operatively seated in the spindle shaft 11 in a tapered socket which comprises a pair of spaced apart, aligned outer and inner tapered bores or seats 57 and 57'. The tool holder 12 may be of any suitable conventional type, as for example, the self-locking tool holder illustrated in detail in our co-pending continuation-in-part patent application entitled "SELF-LOCKING CHUCK", and filed simultaneously herewith under Ser. No. 767,176, on Feb. 9, 1977.

The tool holder 12 includes a tool holder body 58 around which is formed a V-shaped slot 59 for the reception of a conventional tool changer arm for inserting and removing the tool holder 12 from the tapered bores 57 and 57' in the spindle shaft 11. The rear end of the tool holer 12 extends rearwardly in the spindle shaft 11 into an annular groove 102 which communicates with the tapered bores 57 and 57'. A rearwardly extending bore 55 communicates with the annular groove 102. A conventional collet means is axially movable in the bore 55, and it includes a collet body 60 and a plurality of integrally connected collet fingers 68 which are adapted to be operatively engaged with and grip a retention knob 67 which is carried by the tool holder shank 56. The last mentioned collet means is shown in FIG. 1 in a tool holder gripping position wherein the tool holder 12 is retained in the spindle shaft 11 for an operative metal cutting operation. The specific construction of the tool holder 12 and the collet type tool holder gripping means 60, 68 form no part of the present invention. A suitable collet type tool holder gripping means is disclosed and described in detail in the aforementioned co-pending continuation-in-part application. Some of the details of the self-locking chuck disclosed in the last mentioned application are shown in FIG. 1. The numerals 119 designate locking balls which are normally biased radially outward into a locking engagement with an annular tapered ball seat 123 by a suitable spring plunger 101 and a spring 145. The locking balls 119 are released from locking engagement with the annular ball seat 123 when the draw bar and tool holder gripping means 13 is moved from the position shown in FIG. 1 to the right, so as to have the end of the draw bar 62 push the spring plunger 101 to the right against the pressure of the spring 145 to permit the locking balls 119 to move inwardly and release the tool holder 12.

The draw bar assembly 13 includes the draw bar 62 which is axially movable in a spindle bore portion 65. The front end of the draw bar 62 is piloted in a bore in the inner end of the collet body 60. The collet body 60 is retained on the draw bar 62 by a retainer assembly, generally indicated by the numeral 61, which comprises a plurality of disc type springs 61' and a suitable machine screw 61". A suitable disc type spring 61' is one on the market known as a bellville washer. The springs 61' are under a pre-load torque. The draw bar 62 is provided with a reduced diameter threaded rear end shaft 66 which is threadably mounted in a threaded axial bore 69 formed in a cylindrical drive nut 70. The threaded rear end shaft 66 and the drive nut 70 are preferably provided with mating left hand threads. The cylindrical drive nut 70 is rotatably positioned in a spindle shaft bore portion 71 which communicates with the spindle shaft bore portion 65.

Figure 2:
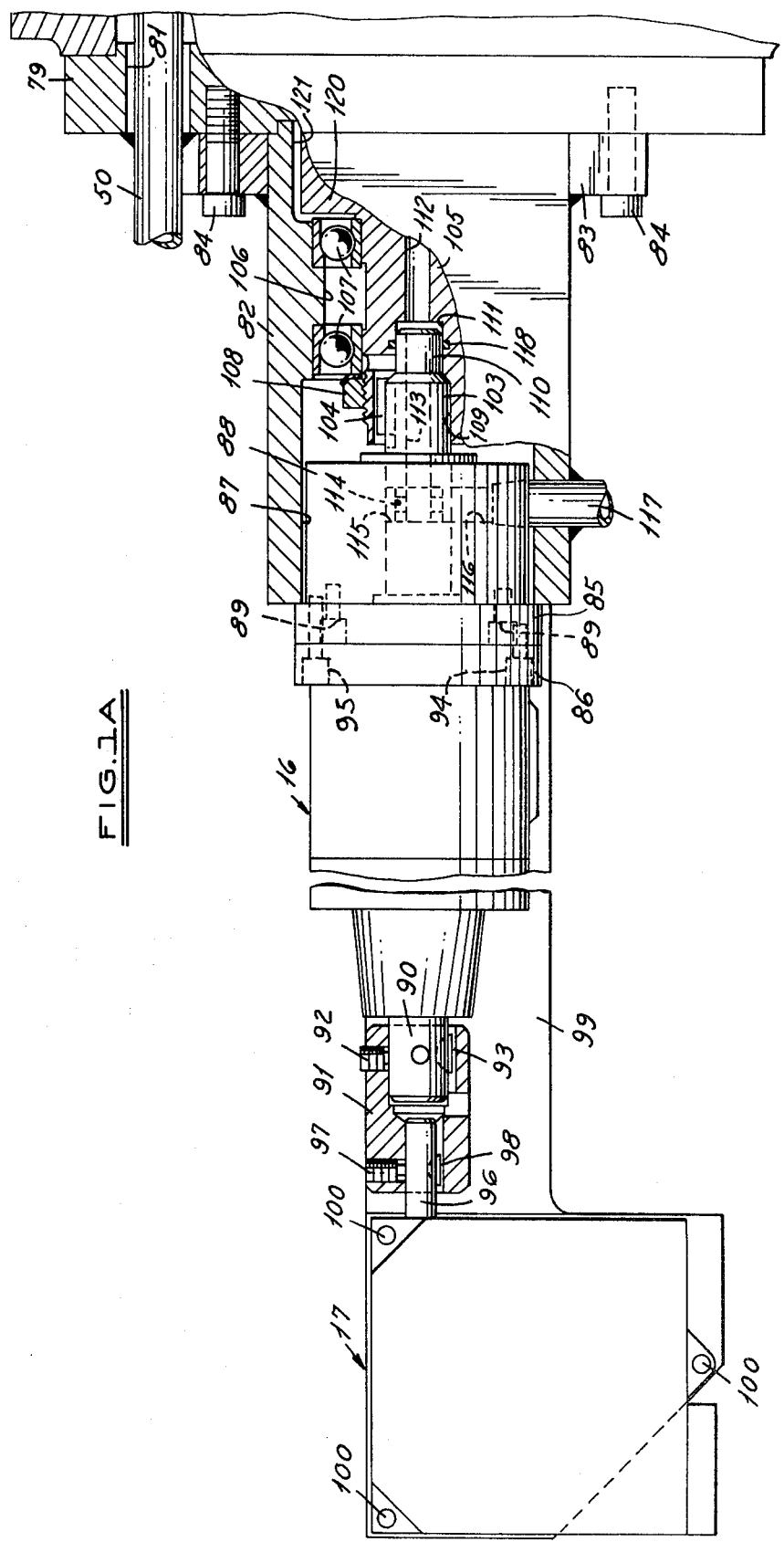
FIG. 2 is a fragmentary, elevation section view of the structure illustrated in FIG. 1, taken along the line 2—2 thereof, and looking in the direction of the arrows.

The draw bar assembly 13 does not rotate relative to the spindle shaft 11. As shown in FIGS. 1 and 2, the draw bar 62 is provided with a portion 63 which is polygon shaped in cross section and which is located adjacent the threaded end shaft 66. As shown in FIG. 2, the polygon shaped portion 63 of the draw bar 62 is three-sided and substantially egg-shaped. The polygon shaped draw bar portion 63 is axially slidable through a mating polygon shaped bore in a sleeve 76 which is seated in the front end of the spindle shaft bore portion 71 against the shoulder formed by the junction of spindle shaft bore portions 65 and 71, (FIG. 1). The sleeve 76 is retained in place against rotation and axial movement by a pair of screws 77 which are threadably mounted transversely in the spindle shaft 11. The inner end of each screw 77 is extended into a slidable locking engagement with a suitable transverse bore in the sleeve 76. It will be seen that draw bar 62 is held against rotation relative to the spindle shaft 11 by the last described polygon mating structure but that the draw bar 62 is axially movable in the spindle shaft 11. The plygon non-rotational structure is advantageous because it can be simply manufactured and it can take a high torque and machine vibrations without any injurious effect thereon. Although conventional spline structure could be employed instead of the polygon structure, the conventional spline structure has the disadvantage of possible errors in matching the spline parts. The last mentioned errors could result in injurious vibrations. Although a three-sided polygon has been illustrated it will be understood that other type polygon structures can be employed, as for example, a four-sided polygon structure.

As shown in FIG. 1, the cylindrical drive nut 70 is retained against forward axial movement in the spindle shaft 11 by a front carbide bearing ring 72. The carbide bearing ring 72 is seated on a reduced diameter front end portion of the drive nut 70, and it is fixed to the drive nut 70 by any suitable means, as by brazing. The front carbide bearing ring 72 is seated in the spindle shaft bore portion 71 and it slidably engages the adjacent surface of a front carbide thrust bearing 64 which is fixed, as by brazing to the adjacent end of the polygon sleeve 76. A rear carbide bearing ring 73 is mounted on a reduced diameter rear end portion of the cylindrical drive nut 70, and it is fixed, as by brazing, to the drive nut 70. The rear carbide bearing ring 73 slidably engages the adjacent surface of a rear carbide thrust bearing 64' in the spindle shaft bore portion 71. The rear carbide thrust bearing 64' is fixed, as by brazing, to the adjacent end of an annular retainer collar 74 which is operatively mounted in the end of the spindle shaft bore portion 71. The annular retainer collar 74 is retained in place by suitable machine screws 75 which attach an integral radial flange on the collar 74 to the rear end of the spindle shaft 11. The numeral 78 designates the reduced diameter rear end portion of the draw bar cylindrical drive nut 70. The draw bar end 78 extends through the annular retainer collar 74, and the attached carbide thrust bearing 64', and rearwardly beyond the inner end of the spindle shaft 11. As shown in FIG. 1, the rear end of the machine tool housing portion bore 21 is enclosed by an end plate 79 which is secured to the machine tool housing 19 by any suitable means, as by a plurality of machine screws 80. The bearing lubricant tubing 50 extends through a bore 81 formed through the end plate 79.

As shown in FIG. 1A, a cylindrical bearing and draw bar assembly drive motor support housing 82 is provided with an annular flange 83 at the front end thereof and which is secured thereto by any suitable means as by welding. The bearing housing 82 and flange 83 are secured to the machine tool housing end plate 79 by a plurality of suitable machine screws 84. As shown in FIG. 1A, the bearing and drive motor housing 82 is provided with an axial bore 87 which extends inwardly at the rear end thereof, and in which is operatively mounted a cylindrical hydraulic fitting block 88 which has secured to the rear end thereof a flange 85 by a plurality of machine screws 89. The drive motor 16 has a flange 86 operatively attached to the front end thereof, and the flange 86 is secured to the flange 85 by any suitable means, as by machine screws 94. The flanges 85 and 86 are secured to the housing 82 by any suitable means, as by machine screws 95. The draw bar assembly drive motor 16 may be any suitable hydraulic motor, as for example, one available on the market and known as a Char-Lynn hydraulic motor. The drive motor 16 has a first shaft 90 extended from the rear end thereof, and it is operatively mounted in a bore in one end of a surfaces coupling 91. The motor shaft 90 is secured to the coupling 91 by a suitable set screw 92 and a Woodruff key 93. The broken collet indicator means 17 comprises a rotary limit switch which has an input shaft 96 extended from one end thereof. The input shaft 96 is operatively mounted in a bore in the coupling 91 and the last mentioned bore is aligned with the bore that contains the first motor shaft 90. The switch input shaft 96 is secured to the coupling 91 by a suitable set screw 97 and a suitable Woodruff key 98. A support arm 99 has one end fixed by any suitable means to the bearing housing 82. The rotary limit switch 17 is secured to the support arm 99 by any suitable means, as by a plurality of suitable machine screws 100. The rotary limit switch 17 may be of any suitable type, as for example a rotary limit switch obtainable from the General Electric Company, under Model No. CR115E441102. The operation of the rotary limit switch 17 is described in detail hereinafter.

As shown in FIG. 1A, the draw bar assembly drive motor 16 is provided with a second output shaft, or drive shaft 103, which extends through the flanges 86 and 85, and the block 88, and into an axial bore 109 in the outer end of a drive shaft 105. The motor drive shaft 103 is connected to the drive shaft 105 by a suitable Woodruff key 104. The motor drive shaft 103 is provided with an integral reduced diameter drive motor shaft extension 110 which is slidably mounted in a reduced diameter bore 111 which communicates with the bore 109, and the hydraulic fluid passage 112 which is axially formed through the drive shaft 105. An O-ring seal means 118 is operatively mounted around the outer periphery of the shaft extension 110 in the bore 111. The drive shaft 105 is rotatably mounted in a pair of suitable ball bearing means 107 which have their outer races operatively sealed in the bore 106, in the front end of the housing 82. A lock nut 108 functions to retain the bearings 107 in place. The bore 106 communicates with the bore 87 in the rear end of the housing 82.

As shown in FIG. 1A, the hydraulic fluid passage 112 communicates at the left end thereof, as viewed in FIG. 1A, with the axial bore 111 which in turn communicates with an axial hydraulic fluid passage 113 formed through the drive motor shaft portions 103 and 110. The drive motor shaft 103 has a peripheral groove 115 formed therearound within the block 88. The peripheral groove 115 is connected by a plurality of radially extended bores 114 with the axial bore 113. A radial bore 116 is formed through the block 88 and communicates at its inner end with the peripheral groove 115 and its outer end with a hydraulic fluid tubing 117 for admitting hydraulic fluid under pressure into the bore 116 and thence to the groove 115 and the bores 114 and into the passages 113 and 112.

Figure 3:
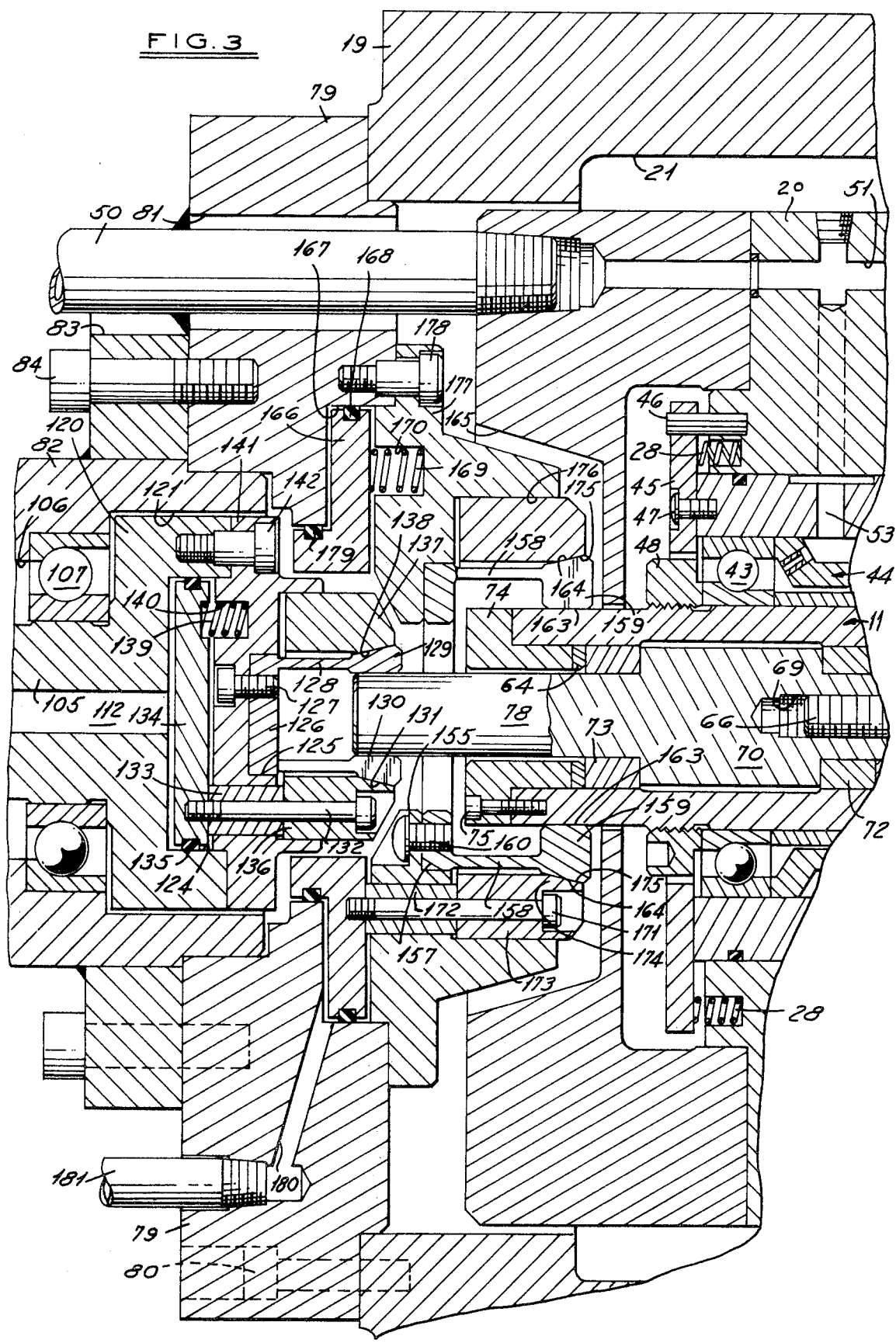

As best seen in FIG. 3, an annular drive head 120 is integrally connected to the front end of the drive shaft 105, and it is rotatably mounted in a bore 121 in the housing 82. The bore 121 communicates with the bore 106 in the bearing housing 82. As shown in FIG. 3, the drive head 120 is provided with an annular piston bore or cylinder 124, on the front side thereof, which communicates with the hydraulic fluid passage 112. The annular piston cylinder 124 is enclosed by a suitable piston cylinder head plate 141 which is retained in place by suitable machine screws 142.

The cylinder head plate 141 is provided on its front face with an axial bore 125 in which is seated an annular collet heat 126. The collet head 126 is secured to the piston cylinder head plate 141 by suitable machine screws 127. Integrally attached to the collet head 126 are a plurality of collet fingers 128 which extend toward the draw bar end 78 and form a complete circle therearound. Each of the collet fingers 128 is provided on the front end thereof with a tapered finger tip or lug 129. Each of the collet tapered finger tips 129 is provided with a radially inward, offset inner surface 130 that is parallel to the outer surface of the reduced diameter end 78 of the cylinder actuator drive nut 70. Each of the collet finger tips 129 is provided with a tapered outer surface 131 which diverges in the direction of the drive nut 70. The collet finger tapered surfaces 131 form what may be termed a conical or frusto-conical annular cam surface which is spaced radially outward from the end 78 of the cylindrical actuator drive nut 70. The collet fingers 128 are adapted to have their finger tips 129 forced radially inward against the end 78 of the cylindrical actuator drive nut 70 for gripping the same, and for turning the nut 70 to rotate the draw bar 62 and in turn, operate the tool holder gripping means, as desired.

As shown in FIG. 3, an annular piston 134 is slidably mounted in the piston cylinder or bore 124 in the annular drive head 120. The piston 134 is provided with a suitable O-ring seal means 135 around the outer periphery thereof. A clamp ring 136 is movably mounted about the collet fingers 128, for axial movement therealong, for camming the collet fingers 128 into a gripping engagement with the end 78 of the drive nut 70. The clamp ring 136 is provided with a tapered front end 137 which has an inner annular surface 138 which tapers outwardly and forwardly, or in a diverging manner, toward the drive nut end 78. The clamp ring 136 is attached to the piston 134 by a plurality of suitable machine screws 132 which are secured to the piston 134 through suitable spacers 133 that are mounted through suitable apertures in the piston cylinder head plate 141. The machine screws 133 are disposed in a circular pattern about the clamp ring 136.

The clamp ring diverging inner end surface 136 is adapted to mate with the outer tapered surfaces 131 on the tapered finger tips 129 and act as a clamping and camming means, for biasing the collet fingers 128 radially inward into a gripping engagement with the reduced diameter end 78 of the cylindrical actuator drive nut 70 when the piston 134 is moved forwardly, or to the right as viewed in FIG. 3, by hydraulic fluid under pressure from the passage 112. The piston 134 and the clamping ring 136 are shown in the active or operative position in FIGS. 1 and 3, whereby the collet fingers 128 are in their contracted or stressed condition and are in a gripping engagement with the drive nut end 78. The piston 134 is normally biased to the inactive or inoperative position by a plurality of annularly disposed springs 139 which have one end mounted in an axial bore 140 formed in the rear face of the piston cylinder head plate 141, and the other end disposed in a mating aperture in the front face of the piston 134. When the piston 134 is in the inactive or inoperative position, there is no physical contact between the collet fingers 128 and the drive nut end 78.

As shown in FIG. 3, the clamping ring 136 of the first described collet means extends through a suitable opening in the flange 79. The clamp ring 136 also extends through an axial bore in a ring-shaped piston 166 of a second collet means. The piston 166 is operatively mounted in a bore 167 which is formed in the inner face of the flange 79. The piston 166 is provided with a suitable O-ring seal means 168 around the periphery thereof. The piston 166 has a rearwardly extended axial portion which extends into the last mentioned opening through the flange 79, and which is provided with a suitable O-ring seal 179. It will be seen that the chamber formed by the bore 167 between the seals 168 and 179 forms a piston chamber into which fluid under pressure is admitted through the passage 180 and the conduit 181, for moving the piston to the active or operative position shown in FIG. 3, against the pressure of a plurality of springs 169 which are disposed in a ring about the front face of the piston 166. An annular support plate 177 is secured to the inner face of the flange 79 by a plurality of suitable machine screws 178. The springs 169 are operatively mounted in individual bores 170 in the rear face of the support plate 177. It will be seen that the springs 169 normally bias the piston 166 to the left, as viewed in FIG. 3, to an inactive or inoperative position. As shown in FIG. 3, the support plate 177 has an axial opening 155 formed therethrough, through which is extended the drive nut end 78 for engagement by the first described collet 128.

An annular collet head 157 is secured to the front face of the support plate 177 by a plurality of suitable machine screws 160. The annular collet head 157 comprises a collet gripping means for gripping the spindle shaft 11, and it is provided with a plurality of integral collet fingers 158. Each of the collet fingers 158 is provided with an enlarged collet finger tip or lug 159 that has an axially extended straight inner surface 163, that is offset radially inward from its respective collet finger 158, which is parallel to the outer surface of the spindle shaft 11. Each of the collet finger tips 159 is provided on the outer face thereof with a tapered surface 164 that diverges in the direction of the spindle shaft 11. The total of the collet outer surfaces 164 forms what may be termed a conical or frusto-conical annular cam surface which is radially spaced from the spindle shaft 11.

As shown in FIG. 3, the support plate 177 includes a portion which extends forwardly, or to the right as viewed in FIG. 3, into a tapered recess 165 formed in the inner end of the motor housing 20. The spindle shaft 11 extends to the left, as shown in FIG. 3, through the last mentioned portion of the motor housing 20. A clamp ring 173 is seated in a bore 176 formed in the front side of the support plate 177. The clamp ring 173 is fixed to the piston 166 by a plurality of suitable machine screws 171 which are secured to the piston 166 through suitable spacers 172 that are mounted through suitable apertures formed through the support plate 177. The machine screws 171 are disposed in a circular pattern about the clamp ring 173. The clamp ring 173 is provided with a tapered front end 174 which has an inner annular surface 175 which tapers radially outward and forwardly, or in a diverging manner.

The clamp ring diverging inner end surface 175 is adapted to mate with the outer tapered surfaces 164 on the tapered finger tips 159, and act as a clamping and camming means, for biasing the collet fingers 158 radially inward into a clamping engagement with the rear end of the spindle shaft 11 when the piston 166 is moved forwardly to the active or operative position shown in FIG. 3, by hydraulic fluid under pressure from the passage 180. The piston 166 and the clamping ring 173 are shown in the active or operative position in FIGS. 1 and 3, whereby the collet fingers 158 are in their contracted or stressed position and are in a gripping engagement with the spindle shaft 11. Piston 166 is normally biased to the inactive or inoperative position by the plurality of annularly disposed springs 169. When the piston 166 is in the inactive or inoperative position, there is no physical contact between the collet fingers 158 and the spindle shaft 11.

In use, for an operative machine tool cutting operation, the pistons 134 and 166 are normally moved backward from the positions shown in FIGS. 1 and 3, by the action of the springs 139 and 169, to their inactive or inoperative positions. In the position shown in FIGS. 1 and 3, the draw bar actuator means 15 and the spindle shaft holding means 14 are each in an active or operative position for tool changing. When it is desired to release the tool holder 12 and insert another tool holder, hydraulic fluid under pressure is admitted into the pressure chambers, on the rear or left sides of the pistons 134 and 166, as viewed in FIGS. 1 and 3, so as to move these pistons against the pressure of springs 139 and 169, to their operative positions shown in FIGS. 1 and 3. The last described action moves the clamp rings 136 and 173 to the right so as to move their camming surfaces 138 and 175, respectively, into operative contact with the finger tip outer surfaces 131 and 164, respectively, and force the collet finger tips 129 and 159 radially inward into the gripping engagement with the draw bar actuator nut end 78 and the spindle shaft 11, respectively. The spindle shaft 11 is thus held in a fixed position against rotation and the cylindrical actuator drive nut 70 is in a driving relationship with the motor 16 for rotating the draw bar 62 to impart axial movement thereto.

The motor 16 is actuated in a direction to rotate the drive nut 70 so as to move the threaded draw bar end 66 outward of the drive nut 70 to move the draw bar 62 to the right, as viewed in FIG. 1. The last mentioned movement of the draw bar 62 moves the tool holder gripping means comprising the collet body 60 and the collet fingers 68 to the right and into a released position from the tool holder retention knob 67. The continued movement to the right of the draw bar 62 forces the right end of the draw bar, as viewed in FIG. 1, into operative engagement with the tool holder 12 for moving it outwardly of the spindle tapered bore 57 to release the tool holder 12 from the spindle shaft 11. If the illustrated self-locking tool holder of said co-pending continuation-in-part application is employed, the draw bar 62 pushes on the spring plunger 101 to release the locking balls 119 carried in the tool holder shank 56. The tool holder 12 is then removed by any suitable tool change means and a new tool holder 12 inserted into the tapered bores 57 and 57' in the spindle shaft 11. The motor 16 is then operated in the opposite direction so as to rotate the actuator drive nut 70 in the opposite direction to move the draw bar 62 inwardly, to the left, to the position shown in FIG. 1. The last mentioned action operates the tool holder gripping means so as to draw the new tool holder 12 into the spindle shaft tapered bores 57 and 57', into a operative position in the spindle shaft 11. When the new tool holder 12 is properly positioned, the hydraulic fluid pressure operating against each of the pistons 134 and 166 is removed, and the spindle shaft holding means 14 and the draw bar actuator means 15 are released and moved by the springs 169 and 139, respectively, to the inoperative position, and the spindle shaft 11 is again free to be rotated for a machine tool cutting operation.

The collet indicator means 17 functions in the following described manner. When the tool holder gripping means, comprising the collet head 60 and collet fingers 68, are not broken but are operating correctly, the motor 16 functions through the spindle holding means 14 and the draw bar actuator means 15 to rotate the draw bar actuator drive nut 70 several revolutions in one direction to move the draw bar 62 forwardly about ⅜ inch to unclamp the tool holder 12. The drive nut 70 is rotated in the opposite direction to move the draw bar 62 rearwardly ⅜ inch to clamp a new tool holder 12 in position in the spindle 11. If a tool holder 12 is not loaded for some reason and the draw bar is actuated in the clamping direction, then the draw bar will be moved rearwardly beyond ⅜ inch, as for example ½ inch, and an overtravel switch in the switch means 17 is actuated to give a signal. Also, if a tool holder hangup occurs, or the draw bar did not clamp or unclamp a tool holder 12, then a timer switch in the switch means 17 operates after a three second interval to shut down the power to the machine controls, and the controls must be reset in order to get the power returned. Any suitable means may be employed with the switch means 17 for picking up the signal and giving either a visual or audible signal, or both. It will be seen that when the spindle shaft holding means 14 and draw bar actuator means 15 are operated, that they do not impart any longitudinal force or thrust on the spindle shaft 11 during a tool holder changine operation so as to unseat the high speed spindle shaft 11 from the bearings 33, 34, 42 and 43.

Figure 4:
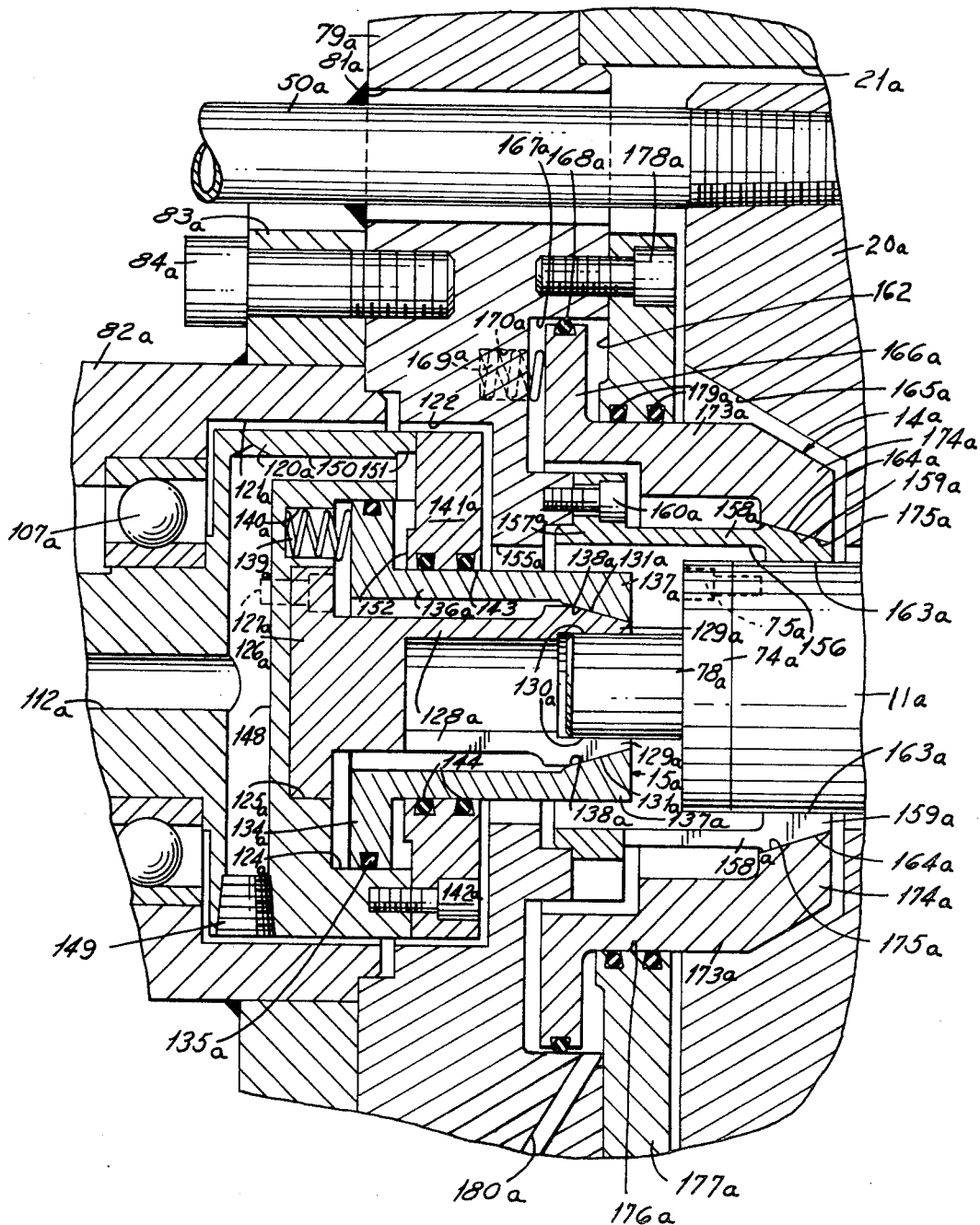
FIG. 4 is a fragmentary, enlarged, elevation section view of a second embodiment of a draw bar actuator means employed in the invention.

FIG. 4 illustrates a second embodiment of the invention, and the parts of the embodiment of FIG. 4 which are the same as the first embodiment shown in FIGS. 1 and 3 have been marked with the same reference numerals followed by the small letter "a".

Integrally connected to the inner end of the drive shaft 105a is an annular drive head 120a which is rotatably mounted in the bore 121a in the housing 82a. Bore 121a communicates with the bore 106a in the housing 82a. As shown in FIG. 4, the annular drive head 120a also extends into bore 122 in end plate 79a. The bore 122 is aligned with the bore 121a. As shown in FIG. 4, the drive head 120a is provided with a stepped bore extending inwardly from its front end, as indicated by a first bore portion 124a and a communicating smaller diameter bore 125a. An annular collet head 126a is seated in the bore 125a and it is releasably secured to the drive head 120a by any suitable means, as by machine screws 127a. Integrally attached to the collet head 126a are a plurality of collet fingers 128a which extend forwardly through the end plate 79a and into operative engagement with the end 78a on the cylindrical draw bar actuator drive nut 70.

The collet fingers 128a are axially extended and form a complete circle around the end 78a of the cylindrical actuator drive nut 70. Each of the collet fingers 128a is provided on its forward end with a finger tip or lug 129a which has a radially inward offset inner surface 130a that is parallel to the outer surface of the 78a of the cylindrical actuator drive nut 70. Each of the collet finger tips 129a is provided with a converging or tapered outer surface 131a. The total of the collet finger surfaces 131a forms what may be termed a conical or frusto conical annular cam surface spaced radially outward from the end 78a of the actuator drive nut 70. The collet fingers 128a are adapted to have their finger tips 129a forced radially inward against the end 78a of the cylindrical actuator drive nut 70 for gripping the same and for turning the drive nut 70 to rotate the draw bar 62 and in turn, operate the tool holder gripping means as desired.

As shown in FIG. 4, an annular piston 134a is mounted around the axially extended collet fingers 128a, and it is slidably mounted in the bore 124a in the annular drive head 120a. The piston 134a is provided with a suitable O-ring seal means 135a around the outer periphery thereof. A clamp ring 136a is integrally formed on the front side of the piston 134a and it extends axially forward over the collet fingers 128a. The end 137a of the clamp ring 136a is provided on the inner side thereof with an outwardly converging or tapered surface designated by the numerical 138a.

The clamp ring inner surface 138a is adapted to mate with the outer surfaces 131a on the collet finger tips 129a and act as a camming means for camming the collet fingers 128a radially inward into a gripping engagement with the end 78a of the cylindrical actuator drive nut 70 when the piston 134a is moved rearwardly to the active position shown in FIG. 4, by hydraulic pressure. The piston 134a and clamp ring 136a are shown in the active or operative position in FIG. 4, whereby the collet fingers 128a are in their contracted or stressed condition and are in a gripping engagement with the drive nut end 78a. The piston 134a is normally biased to the inactive or inoperative position by a plurality of springs 139a which have one end bearing against the outer face of the piston 134a, and the other end mounted in an axial bore 140a formed in the annular drive head 120a.

The outer end of the bore 124a in the annular drive head 120a is enclosed by a suitable cylinder head plate 141a which is retained in place by suitable machine screws 142a. The clamp ring 136a extends through bore 143 formed through the head plate 141a. Suitable O-ring seals 144 are carried in the surface of the bore 143 for operative engagement against the outer surface of the clamp ring 136a.

The chamber 152 between the inner face of the cylinder head plate 141a and adjacent face of the piston 134a forms a pressure chamber into which is forced hydraulic fluid under pressure for moving the piston 134a to the active position shown in FIG. 4, against the pressure of springs 139a for camming the collet fingers 128a into a gripping engagement with the hydraulic actuator drive nut end 78a. The hydraulic fluid is introduced into the cylinder chamber 152 through the hydraulic passages 150 and 151 which communicate with the hydraulic fluid passage 148. The numeral 149 designates a plug which closes one end of the hydraulic fluid passage 148. The hydraulic fluid passage 148 is connected to the aforedescribed hydraulic fluid passage 112a which is supplied with hydraulic fluid under pressure from the supply tube 117 shown in FIG. 1A.

As shown in FIG. 4, the clamp ring 136a extends through a bore 155a formed through the end plate 79a and into a cylindrical chamber 156 formed in collet gripping means comprising an annular collet head 157a and a plurality of integral collet fingers 158a. The collet head 157a is secured by any suitable means, as by a plurality of machine screws 160a, to the inner side of the end plate 79a. Each of the collet fingers 158a is provided with a collet finger tip or lug 159a that has an axially extended straight inner surface 163a that is parallel to the outer surface of the spindle shaft 11a. Each of the collet finger tips 159a is provided on the outer face thereof with a forwardly extending converging surface 164a. The total collet outer surfaces 164a form what may be termed a conical or frusto-conical annular cam surface which is radially spaced from the spindle shaft 11a.

As shown in FIG. 4, the end plate 79a is provided on its inner face with a bore 167a in which is slidably mounted a cylindrical piston 166a that is mounted over the collet head 157a and its integral collet fingers 158a. The piston 166a is provided with a suitable O-ring seal means 168a and a clamp ring 173a. The clamp ring 173a extends into a tapered recess 165a formed in the inner end of the motor housing 20a. The piston 166a is shown in FIG. 4 in the active or operative position. The piston 166a is normally biased to the inactive position by a plurality of suitable springs 169a. Each of the springs 169a has one end bearing against the rear face of the piston 166a and the other end seated in a suitable bore 170a formed in the end plate 79a.

As shown in FIG. 4, the clamp ring 173a is provided with a radial inward end portion 174a which has a tapered or frusto-conical inner end surface 175a that converges forwardly so as to mate with the camming surfaces 164a formed on each of the collet finger tips 159a. The clamp ring 173a extends through a bore 176a formed through a cylindrical head plate 177a which encloses the outer side of the bore 167a in the end plate 79a so as to form a pressure chamber 162 on the front face of the piston 166a. The cylinder head plate 177a is secured to the end plate 79a by suitable machine screws 178a, and it is also provided with a pair of suitable O-ring seals 179a that bear against the periphery of the clamp ring 173a. The space between the front face of the piston 166a and the adjacent face of the cylinder head plate 177a forms the pressure chamber 162 which is selectively supplied by fluid under pressure by the hydraulic fluid passage 180a which is supplied with hydraulic fluid from a suitable source by the hydraulic fluid tubing 181a, shown in FIG. 1.

In use, the embodiment of FIG. 4 operates in the same manner as the first embodiment shown in FIGS. 1 through 3. When hydraulic fluid under pressure is admitted to the pressure chambers 152 and 162 for pistons 134a and 166a, respectively, these pistons are moved to the positions shown in FIG. 4 to operate the clamp rings 136a and 173a to engage the drive motor with the drive nut end 78a and to hold the spindle shaft 11a.

FIG. 5 illustrates a third embodiment of the invention wherein the working parts of the spindle shaft holding means and the draw bar actuator means are reversed. That is, in the embodiment of FIG. 5, the collet means are movble and the collet clamp ring means for operating the collet means is fixed. The parts of the embodiment of FIG. 5 which are the same as the first and second embodiments shown in FIGS. 1 through 3, and FIG. 4, respectively, have been marked with the same reference numerals followed by the small letter "b".

As shown in FIG. 5, a piston cylinder or chamber 182 is connected to the hydraulic fluid inlet passage 112b. Slidably mounted in the piston chamber 182 is a collet piston 183 which also forms an annular collet head on which is integrally attached a plurality of collet fingers 185. The collet head or piston 183 is provided with a suitable O-ring seal 184. Each of the collet fingers 185 is provided with a collet finger tip 186 which has an inner longitudinally extending surface 187 for gripping engagement with the draw bar actuator drive nut end 78b. Each of the collet finger tips 186 is provided with an outer conical or converging cam surface 188. The collet piston 183 is shown in FIG. 5 in the active or operative position, and it is adapted to be normally biased to the left, from the active position of FIG. 5 to an inoperative or inactive position by a plurality of springs 193. One end of each of the springs 193 is seated against the front side of the collet piston 183 and the other end is seated in a suitable bore 193 in a cylinder head plate 191. The cylinder head plate 191 is secured over the open end of the chamber 182 by a plurality of suitable machine screws 192 which secure the head plate 191 to the annular drive head 120b.

A clamp ring 195 has its rear end integrally connected to the cylinder head plate 191 and it is seated around the collet fingers 185. The clamp ring 195 is provided with a front end 196 which is extended radially sideward and inward towards the actuator drive nut end 78b. The clamp right front end 196 is provided on its inner side with a tapered or converging inner surface 197 which is adapted to be in slidable engagement with the outer surfaces 188 on the cam finger tips 186. It will be seen tht when fluid under pressure is admitted to the piston chamber 182, that the piston 183 will be moved against the pressure of spring 193 to the active or operative position shown in FIG. 5, so as to move the collet fingers 185 and their tips 186 into slidable camming engagement against the clamp ring 195 so as to force the collet finger tips 186 radially inward against the actuator drive nut end 78b and grip the same.

A piston cylinder or chamber 200 is formed in the inner side of the end plate 79b and has slidably mounted therein a piston 203 which is provided with a suitable O-ring seal means 204. As shown in FIG. 5, the piston chamber 200 is adapted to be supplied with hydraulic fluid under pressure through a hydraulic fluid passage 201 which is supplied with hydraulic fluid from a suitable source thereof by a tube 202.

As shown in FIG. 5, the piston 203 is provided with an axial tubular extension or sleeve 205 which is slidably mounted in a bore 206 that is formed through the end plate 79b and which communicates with the bore 121b in the housing 82b. The piston sleeve 205 is provide with a suitable O-ring seal means 207 around the periphery thereof. The piston sleeve 205 is provided with a tapered bore 208 on its outer end. A collet head 211 is secured to the piston 203 by a plurality of machine screws 212. Integrally attached to the collet head 211 are a plurality of collet fingers 213, each of which is provided with a collet finger tip 214. Each of the collet finger tips 214 is provided with a longitudinally extending straight inner surface 215 which is adapted to be engaged with the spindle shaft 11b during a spindle holding operation. The outer surface 216 of each of the collet finger tips 214 is tapered and converges inwardly. The piston 203 is shown in FIG. 5 in an active or operative position. The piston 203 is normally biased to an inactive or inoperative position by a plurality of springs 209 which each have one end bearing against the front side of the piston 203 and the other end seated in a bore 210 formed in a cylinder head plate 219. The cylinder head plate 219 is secured to the end plate 79b by a plurality of suitable machine screws 220. A conically shaped clamp ring 221 is integrally attached to the cylinder head plate 219 and has the inner end 222 extended radially inward toward the spindle shaft 11b. The inside surface of the cam cylinder end 222 is tapered, as indicated by the numeral 223, and it mates with the outer tapered surfaces 216 on the collet finger tips 214.

The spindle shaft holding means 14b and the draw bar actuator means 15b *illustrated in FIG. 5, function in a manner reverse to the first and second described embodiments, but they carry out the same overall function of operating the draw bar and the tool holder gripping means, as desired.*

It will be seen that when hydraulic fluid under pressure is admitted to the piston chambers 182 and 200, that the pistons 183 and 203 and their attached collet fingers 185 and 213, respectively, are moved to the right to their operative positions shown in FIG. 5. The collet finger tips 186 and 214 slide against the cam surfaces 197 and 223, respectively, and they are cammed radially inward into gripping engagement with the actuator drive nut end 78b and the spindle shaft 11b, respectively. The spindle shaft 11b is thus held in a fixed position and the draw bar actuator drive nut 70b is secured to the drive shaft 105b for operation of the draw bar in the same manner as explained hereinbefore in the description of the operation of the first embodiment.

While it will be apparent that the preferred embodiments of the invention herein disclosed are well calculated to fulfill the objects above stated, it will be appreciated that the invention is susceptible to modification, variation and change.

What is claimed is:

1. In a machine tool having a rotary hollow spindle shaft with a draw bar assembly including a tool holder gripping means mounted in said spindle shaft for axial movement with respect thereto, between an operative position for retaining a tool holder or the like in said spindle shaft, and an inoperative position to permit a tool holder or the like to be removed from or inserted into the spindle shaft, the combination comprising:
   (a) actuator means for moving said draw bar assembly between said operative and inoperative positions;
   (b) spindle shaft holding means for holding the spindle shaft stationary when the draw bar assembly is moved between said operative and inoperative positions;
   (c) a drive motor;
   (d) means for selectively connecting and disconnecting said drive motor and said draw bar assembly; and
   (d) indicator means operatively connected to said drive motor for indicating an inoperative tool holder gripping means and a no-tool holder condition.

2. The machine tool structure as defined in claim 1, wherein:
   (a) said indicator means comprises a counting switch means which counts the revolutions of the drive motor.

3. The machine tool structure as defined in claim 1, wherein said collet means includes:
   (a) a movable collet member having a plurality of collet fingers for gripping engagement with said draw bar assembly rotatable drive means; and,
   (b) a fixed collet clamp ring member for camming said collet fingers into a gripping engagement with said draw bar assembly rotatable drive means.

4. The machine tool structure as defined in claim 3, wherein:
   (a) the collet fingers of said movable collet member are each provided with an outer conical surface that converges toward said draw bar assembly; and,
   (b) the inner end surface of the fixed collet clamp ring member converges toward said draw bar assembly and slidably engages the outer converging conical surfaces of the collet fingers.

5. The machine tool structure as defined in claim 3, wherein:
   (a) said movable collet member is connected to said drive motor.

6. The machine tool structure as defined in claim 3, wherein said spindle shaft holding means includes:
   (a) a movable collet member having a plurality of collet fingers for grpping engagement with said spindle shaft; and,
   (b) a fixed collet clamp ring member for camming said collet fingers into a gripping engagement with said spindle shaft and holding it stationary.

7. The machine tool structure as defined in claim 6, wherein:
   (a) said movable collet members are biased to inactive positions by spring means, and to active positions by fluid pressure means.

8. In a machine tool having a rotary hollow spindle shaft with a draw bar assembly including a tool holder gripping means mounted in said spindle shaft for axial movement with respect thereto, between an operative position for retaining a tool holder or the like in said spindle shaft, and an inoperative position to permit a tool holder or the like to be removed from or inserted into the spindle shaft, the combination comprising:
   (a) actuator means for moving said draw bar assembly between said operative and inoperative positions;
   (b) spindle shaft holding means for holding the spindle shaft stationary when the draw bar assembly is moved between said operative and inoperative positions; and wherein said spindle shaft holding means includes:
      (1) a collet means for selective engagement with the spindle shaft for holding it stationary, or for releasing the spindle shaft for rotation.

9. The machine tool structure as defined in claim 8, wherein said collet means includes:
   (a) a fixed collet member having a plurality of collet fingers for gripping engagement with said draw bar assembly rotatable drive means; and,
   (b) a movable collet clamp ring member for camming said collet fingers into a gripping engagement with said draw bar assembly rotatable drive means.

10. The machine tool structure as defined in claim 9, wherein:
    (a) the collet fingers of said fixed collet member are each provided with an outer conical surface that diverges toward said draw bar assembly; and
    (b) the inner end surface of the movable collet clamp ring member diverges toward said draw bar assembly and slidably engages the outer diverging conical surfaces of the collet fingers.

11. The machine tool structure as defined in claim 9, wherein:
    (a) the collet fingers of said fixed collet member are each provided with an outer conical surface that converges toward said draw bar assembly; and,
    (b) the inner end surface of the movable collet clamp ring member converges toward said draw bar assembly and slidably engages the outer converging conical surfaces of the collet fingers.

12. The machine tool structure as defined in claim 9, wherein:
    (a) said movable collet clamp ring member is connected to said drive motor.

13. The machine tool structure as defined in claim 9, wherein:
    (a) said movable collet clamp ring member is biased to an inactive position by spring means, and to an active position by fluid pressure means.

14. The machine tool structure as defined in claim 9, wherein:
    (a) said movable collet member is biased to an inactive position by spring means, and to an active position by fluid pressure means.

15. The machine tool structure as defined in claim 8, wherein said collet means includes:
    (a) a fixed collet member having a plurality of collet fingers for gripping engagement with said spindle shaft; and,
    (b) a movable collet clamp ring member for camming said collet fingers into a gripping engagement with said spindle shaft for holding it stationary.

16. The machine tool structure as defined in claim 8, wherein said collet means includes:

(a) a movable collet member having a plurality of collet fingers for gripping engagement with said spindle shaft; and,
(b) a fixed collet clamp ring member for camming said collet fingers into a gripping engagement with said spindle shaft for holding it stationary.

17. The machine tool structure as defined in claim 9, wherein said spindle shaft holding means includes:
(a) a fixed collet member having a plurality of collet fingers for gripping engagement with said spindle shaft; and,
(b) a movable collet clamp ring member for camming said collet fingers into gripping engagement with said spindle shaft for holding it stationary.

18. The machine tool structure as defined in claim 17, wherein:
(a) said movable collet clamp ring members are biased to inactive positions by spring means, and to active positions by fluid pressure means.

19. In a machine tool having a rotary hollow spindle shaft with a draw bar assembly including a tool holder gripping means mounted in said spindle shaft for axial movement with respect thereto, between an operative position for retaining a tool holder or the like in said spindle shaft, and an inoperative position to permit a tool holder or the like to be removed from or inserted into the spindle shaft, the combination comprising:
(a) said draw bar assembly has a portion which is polygon shaped in cross section; and,
(b) said polygon shaped portion of the draw bar assembly is slidably mounted in a mating polygon shaped portion in the hollow spindle shaft, whereby the draw bar assembly is nonrotational relative to the spindle shaft but is axially movable therein;
(c) actuator means for moving said draw bar assembly between said operative and inoperative positions; and,
(d) spindle shaft holding means for holding the spindle shaft stationary when the draw bar assembly is moved between said operative and inoperative positions.

* * * * *